United States Patent [19]
Udagawa et al.

[11] Patent Number: 5,363,454
[45] Date of Patent: Nov. 8, 1994

[54] IMAGE PROCESSING APPARATUS

[75] Inventors: Yutaka Udagawa, Machida; Masahiro Funada, Yokohama; Ken-ichi Ohta, Kawasaki; Yoichi Takaragi, Yokohama; Eiji Ohta, Fujisawa, all of Japan

[73] Assignee: Canon Kabushiki Kaisha, Tokyo, Japan

[21] Appl. No.: 904,707

[22] Filed: Jun. 26, 1992

[30] Foreign Application Priority Data

Jul. 1, 1991 [JP] Japan .................................. 3-160561

[51] Int. Cl.⁵ .............................................. G06K 9/46
[52] U.S. Cl. ..................................... 382/17; 358/448; 358/501; 382/34
[58] Field of Search ........................ 382/17, 54, 44, 41, 382/30, 34; 358/501, 502, 526, 530, 538, 456, 453, 448

[56] References Cited

U.S. PATENT DOCUMENTS

| | | | |
|---|---|---|---|
| 4,723,129 | 2/1988 | Endo et al. | 346/1.1 |
| 4,905,097 | 2/1990 | Watanabe et al. | 358/456 |
| 5,134,667 | 7/1992 | Suzuki | 382/17 |

FOREIGN PATENT DOCUMENTS

| | | | |
|---|---|---|---|
| 273398 | 7/1988 | European Pat. Off. | H04N 1/46 |
| 342060 | 11/1989 | European Pat. Off. | G03G 21/00 |
| 2053619 | 2/1991 | United Kingdom | H04N 1/46 |

OTHER PUBLICATIONS

Kanamori et al., "A Novel Color Transformation Algorithm and Its Applications", SPIE, vol. 1244, Image Processing Algorithms and Techniques, pp. 272-281 (1990).

*Primary Examiner*—Joseph Mancuso
*Attorney, Agent, or Firm*—Fitzpatrick, Cella, Harper & Scinto

[57] ABSTRACT

An image processing apparatus is provided with an input of multivalued image data, converts the inputted multivalued image data into binary image data, generates color data based upon the binary image data resulting from the conversion, judges identity between the generated color data and color data of a plurality of different specific images, and outputs the binary image data resulting from the conversion if non-identity is judged. If identity is judged to exist, however, output of the binary image data resulting from the conversion is halted.

14 Claims, 17 Drawing Sheets

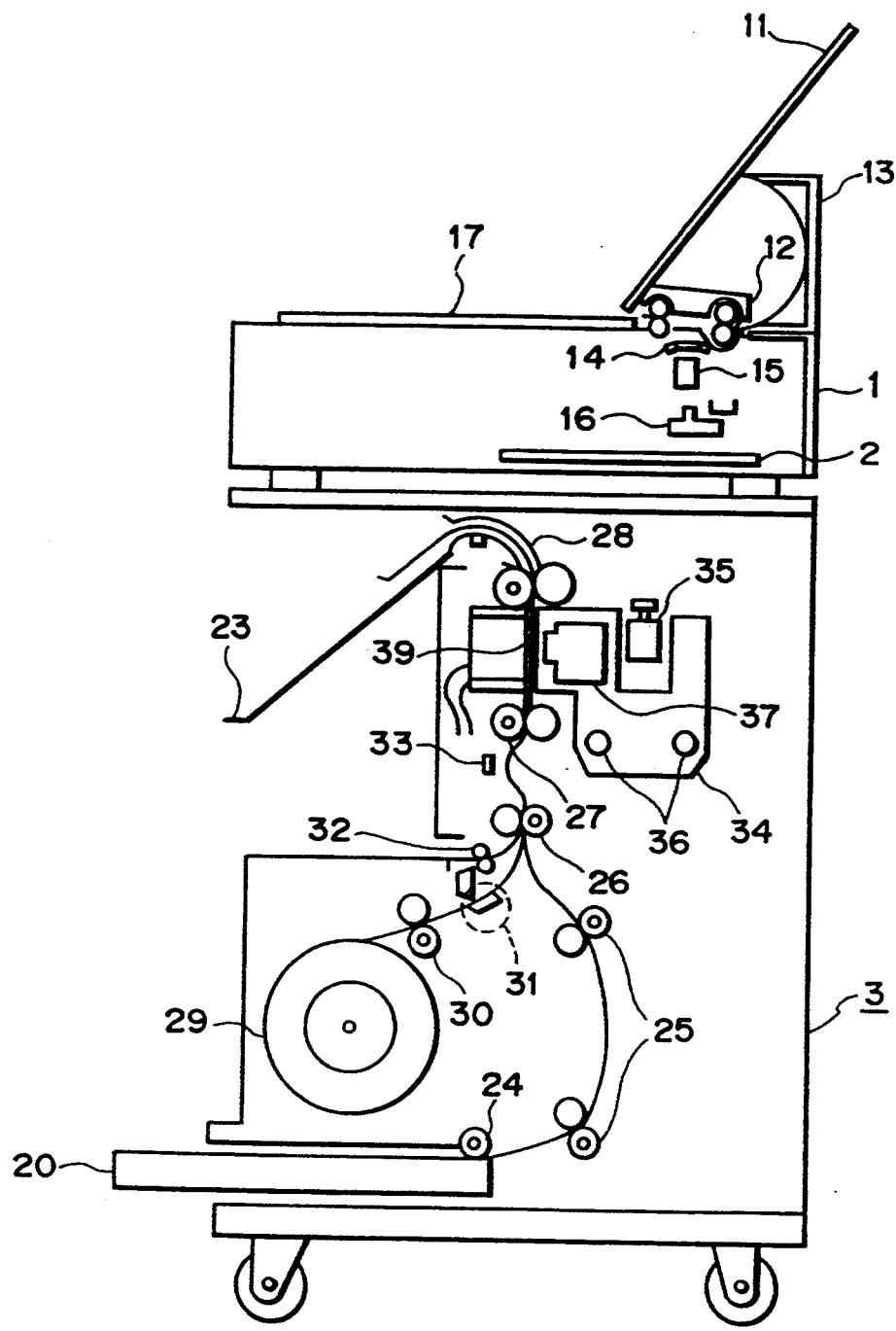
F I G. 2

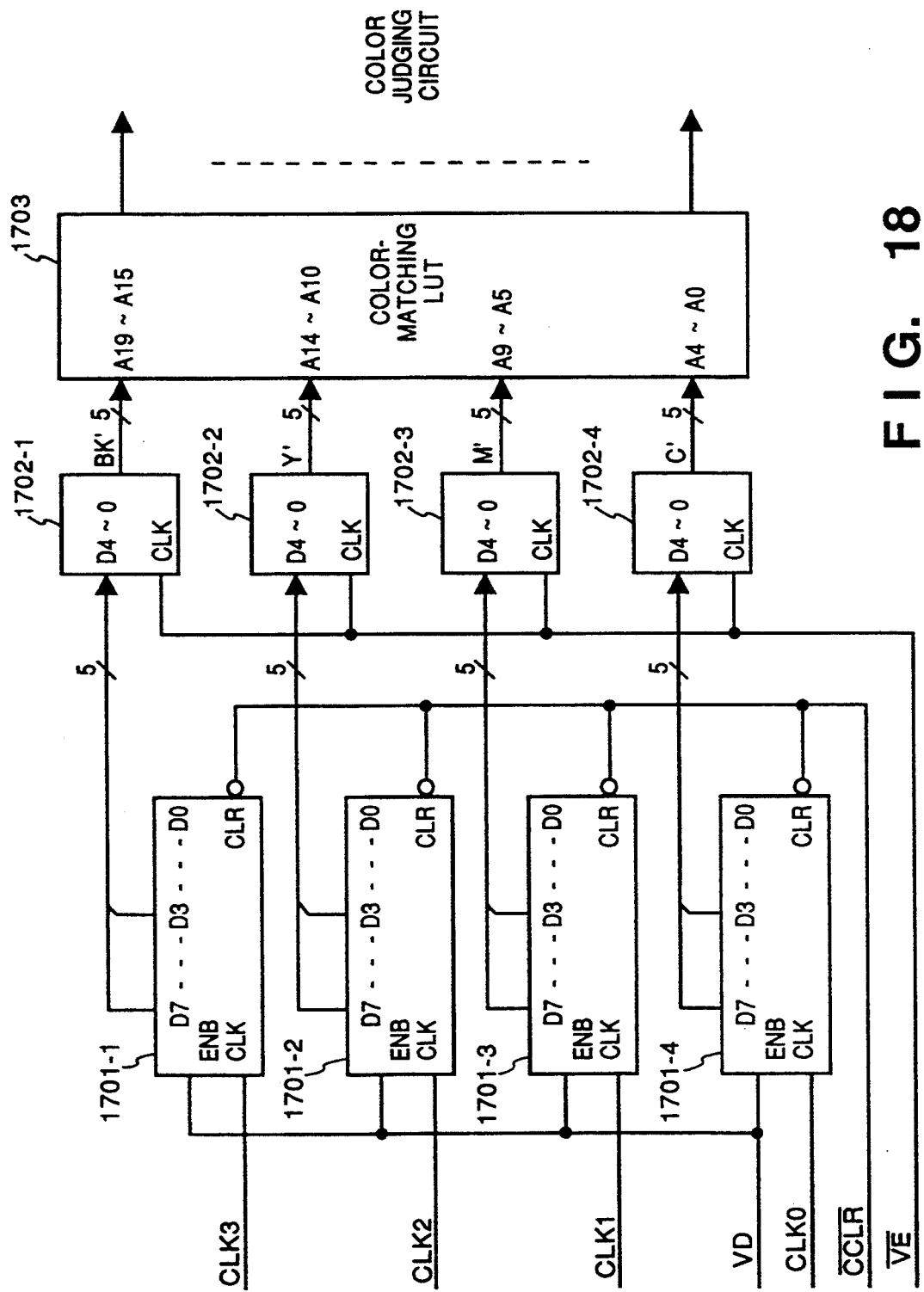
F I G. 18

IMAGE PROCESSING APPARATUS

BACKGROUND OF THE INVENTION

1. Field of the Invention

This invention relates to an image processing apparatus, such as an image processing apparatus having a function for detecting a specific image, such as that of a bank note or security.

2. Description of the Prior Art

Apparatus of this type that have recently been developed feature a large number of tones and a high-image quality in which an image signal expressing one pixel is composed of a large number of bits. Owing to greater sophistication of image processing and an improvement in recording density, even a binary printer is capable of providing a high picture quality approaching that of a multivalued printer.

However, the recent improvements in the picture quality of copying machines which now have a color capability have been accompanied by the fear of counterfeiting, in which specific originals such as bank notes and securities, which are not meant to be copied, are duplicated at such a high picture quality that the copies are almost indistinguishable from the originals.

Thus, a serious shortcoming in the prior art mentioned above is that effective measures for preventing counterfeiting have not been developed for binary printers in which one pixel is expressed by one bit (in the case of color, by the three bits, namely R, G, B bits, or by four bits, namely C, M, Y and Bk bits).

SUMMARY OF THE INVENTION

An object of the invention is to provide an image processing apparatus capable of eliminating the aforementioned drawback of the prior art.

Another object of the invention is to provide an image processing apparatus in which, when an original attempting to be copied is identical with a specific image, output can be controlled not only in case of multivalued image data but also when binary image data is outputted.

Still another object of the invention is to provide an image processing apparatus in which, when an original attempting to be copied is identical with a specific image, output can be controlled by an inexpensive hardware configuration non only in case of multivalued image data but also when binary image data is outputted.

A further object of the invention is to provide an image processing apparatus in which, even if the invention is applied to a binary printer, it is possible to perform processing to determine whether a specific color original is present, in accordance with image data, in order to prevent copying of the specific original or recording of specific-image data inputted from an external device such as a computer.

Yet another object of the invention is to provide an image processing apparatus comprising generating means for generating color data based upon inputted binary image data, judging means for judging identity between the color data generated by the generating means and color data of a plurality of different specific images, and control means for controlling output of the inputted binary image data based upon results of judgment made by the judging means.

Yet another object of the invention is to provide an image processing apparatus comprising conversion processing means for converting inputted multivalued image data into binary image data, generating means for generating color data based upon the binary image data resulting from the conversion performed by the conversion processing means, judging means for judging identity between the color data generated by the generating means and color data of a plurality of different specific images, and control means for controlling output of the binary image data, which results from the conversion performed by the conversion processing means, based upon results of judgment made by the judging means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a sectional side view showing the internal construction of the digital color copier of FIG. 1;

FIG. 18 is a block diagram showing the construction of a principal portion of an image judging unit according to a third embodiment of the invention.

DESCRIPTION OF THE PREFERRED EMBODIMENTS

Preferred embodiment of the present invention will now be described in detail with reference to the accompanying drawings.

Though the present invention is applied to a copier in the embodiments to follow, it goes without saying that the invention is applicable to other types of apparatus as well. In addition, in each apparatus applicable to the invention, specific originals such as bank notes, securities and confidential documents are to be prevented from being counterfeited.

<First Embodiment>

Figure 1:
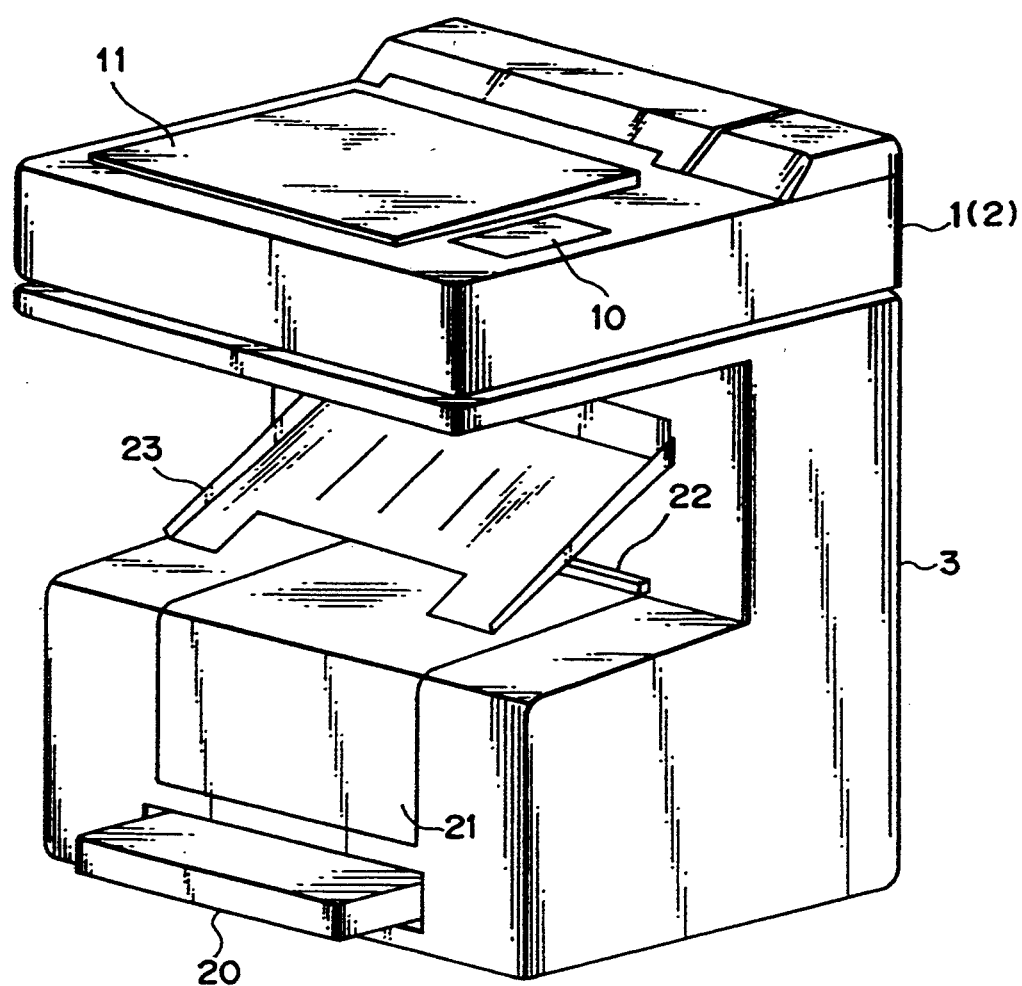
FIG. 1 is an external perspective view showing the configuration of a digital color copier according to a first embodiment of the present invention.

FIG. 1 is an external perspective view showing the configuration of a digital color copier according to a first embodiment of the present invention.

The upper part of the apparatus shown in FIG. 1 comprises a color image scanning section 1 (hereinafter referred to as a "scanning section") for outputting digital color image data, and a controlling unit 2 accommodated within the scanning section 1 for subjecting the digital color image data to various types of image processing and having a processing function such as that for interfacing an external device.

The lower part of the apparatus in FIG. 1 is a printing section 3 for recording on recording paper the color digital image signal outputted by the controlling unit 2.

The two sections mentioned above are capable of being separated and can be installed at separate locations by lengthening the connecting cable.

FIG. 2 is a sectional side view showing the internal construction of the digital color copier illustrated in FIG. 1.

The image of an original placed upon a glass platen 17, an image projected by a projector, or the image of a sheet original from an output feed mechanism 12 is read by an exposure lamp 14, a lens 15 and a CCD line sensor 16 using a CCD that is capable of reading a line image in full color. Various types of image processing are executed by the scanning section 1 and controlling unit 2 to record the image on recording paper by the printing section 3.

In FIG. 2, the recording paper is supplied from a paper-feed cassette 20, which accommodates paper cut to a small size (sizes A4 to A3 in this embodiment), and a paper roll 29 used for recording in large size (sizes A2 to A1 in this embodiment).

By introducing recording paper one sheet at a time from a manual-insertion opening 22 (FIG. 1) while guiding it along a paper-feed cover 21, the recording paper can be introduced manually from outside the apparatus. This is referred to as "manual feed". A pickup roller 24 is for feeding the paper from the paper-feed cassette 20 one sheet at a time. The cut sheets thus supplied are conveyed to a first paper-feed roller 26 by cut-paper feed rollers 25. The rolled paper 29 is fed out by a rolled-paper feed roller 30 and is cut to a fixed length by a cutter 31. The paper thus cut is conveyed to the first paper-feed roller 26. Similarly, recording paper inserted from the manual insertion opening 22 is conveyed to the first paper-feed roller 26 by manual-insertion rollers 32.

The pick-up roller 24, cut-paper feed rollers 25, rolled-paper feed roller 30, first paper-feed roller 26 and manual-insertion rollers 32 are driven by a paperfeed motor (such as a DC servomotor), not shown, and can be started and stopped whenever necessary by electromagnetic clutches attached thereto.

When a printing operation starts in response to a command from the controlling unit 2, the recording paper selectively fed by any of the aforementioned paper-feed paths is conveyed to the first paper-feed roller 26. In order to prevent the recording paper from being fed while askew, the first paper-feed roller 2 is turned on to convey the recording paper to a second paper-feed roller 27 after a paper loop of a prescribed quantity of paper is formed.

A buffer is formed between the first paper-feed roller 26 and the second paper-feed roller 27 to provide the recording paper with a prescribed amount of slack in order to assure that an accurate feeding operation will take place between a paper-feed roller 28 and the second paper-feed roller 27. A sensor 33 senses the amount of buffer. By forming the buffer at all times during conveyance of the paper, it is possible to reduce the load upon the paper-feed roller 28 and second paper-feed roller 27 and assure accurate paper feed in a case where large-sized recording paper is conveyed.

When printing is performed by a recording head 37, a scanning carriage 34 on which the recording head 37 is mounted is made to scan back and forth on carriage rails 36 by means of a scanning motor 35. Only a prescribed amount of the recording paper is fed by the paper-feed roller 28 as the recording head 57 is made to scan one way. At this time the above-mentioned drive system is controlled in such a manner that a prescribed buffer quantity is formed at all times by the paper-feed motor while sensing is performed by the buffer sensor 33.

The recording paper on which printing has been performed is ejected into a paper tray 23 to complete the printing operation.

Figure 3:
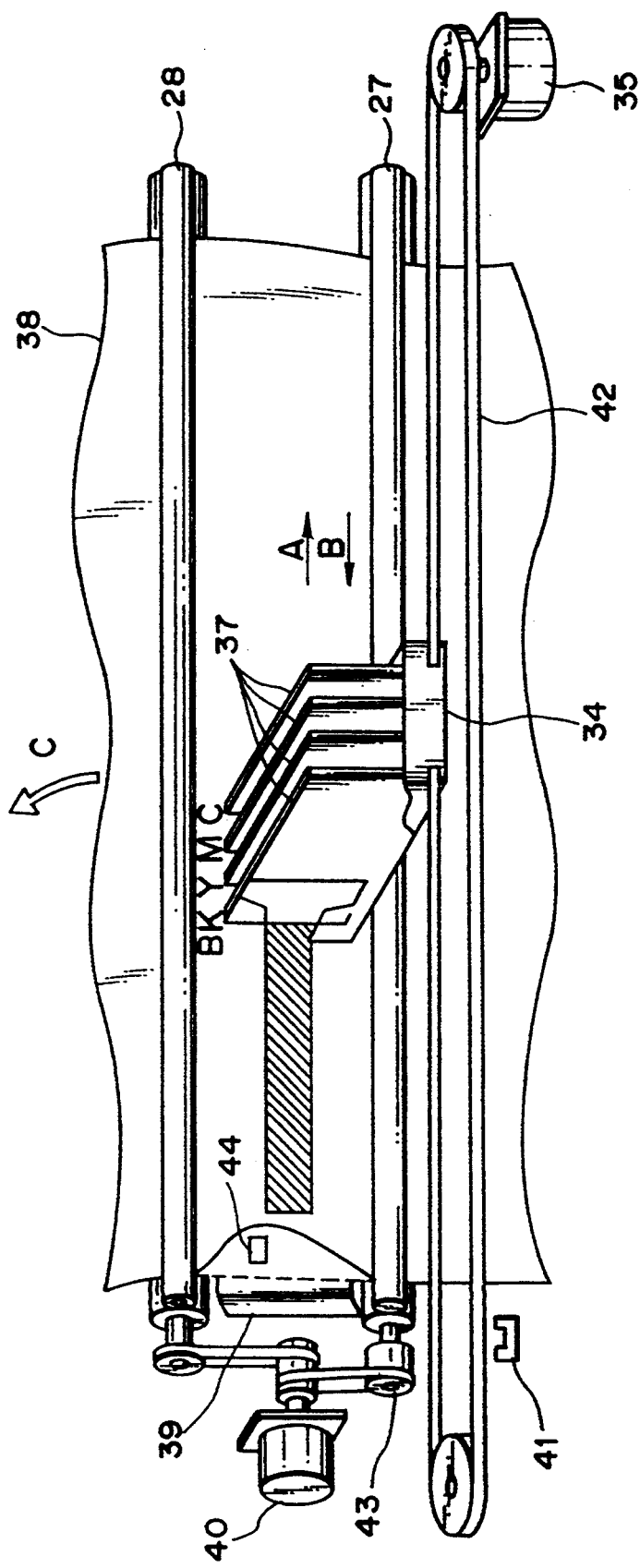
FIG. 3 is a diagram showing a scanning carriage and parts peripheral thereto according to the first embodiment.

FIG. 3 is a diagram illustrating the scanning carriage 34 and parts peripheral thereto according to the first embodiment.

As shown in FIG. 3, a paper-feed motor 40 serves as a drive source for intermittently feeding the recording paper. The motor 40 drives the paper-feed roller 28 and the second paper-feed roller 27, the latter via a second paper-feed roller clutch 43. The scanning motor 35 is a drive source which causes the scanning carriage 34 to perform scanning in the directions of arrows A and B via a scanning belt 34. In this embodiment, pulse motors are used for the paper-feed motor 40 and scanning motor 35 if highly accurate control of paper feed is required. When the recording paper arrives at the second paper-feed roller 27, the second paper-feed roller clutch 43 and the paper-drive motor 40 are turned on to convey the recording paper to the paper-feed roller 28 along a platen 39.

The recording paper is sensed by a paper sensor 44 provided on the platen 39. The sensor information is utilized in positional control and to control jamming.

When the recording paper reaches the paper-feed roller 28, the second paper-feed roller clutch 43 and paper-feed motor 40 are turned off, a suction operation is performed by a suction motor (not shown) from the inner side of the platen 39 so that the recording paper will attracted to the platen 39.

Before the recording paper is subjected to an image-recording operation, the scanning carriage 34 is moved to the position of a home-position sensor 41 and is then made to scan one way, namely in the direction of arrow A. An image is recorded on the recording paper by jetting inks of the colors cyan (C), magenta (M), yellow (Y) and black (K) from the recording head 37 at a prescribed position. When the recording of an image of a predetermined length ends, the scanning carriage 34 is halted and scanning in the return direction, namely the direction of arrow B, begins. As a result, the scanning carriage 34 returns to the position of the home-position sensor 41. During this two-way scan, the recording paper is fed in the direction of arrow C by the length of recording performed thereon by the recording head 37. This feeding of the recording paper is carried out by driving the paper-feed roller 28 using the paper-feed motor 40.

In this embodiment, the recording head 37 is an ink-jet nozzle of the kind described above; 256 nozzles are assembled for each of the colors Y, M, C and K, for a total of four recording-head assemblies.

When the scanning carriage 34 stops at the home position sensed by the home-position sensor 41, an operation for recovering the recording head 37 is performed. This is processing for carrying out a stable recording operation. In order to prevent an irregularity in the ink-jetting start time as caused by a variation in the viscosity of the ink remaining in the nozzles of the recording head 37, processing to apply pressure to the recording head 37 or to discharge the ink with air is carried out depending upon conditions programmed in advance, such as paper-feed time, temperature within the apparatus and jetting time, etc.

Image recording over the entire surface of the recording paper is carried out by repeating the operation described above.

The operation of the scanning section 1 will now be described.

Figure 4:
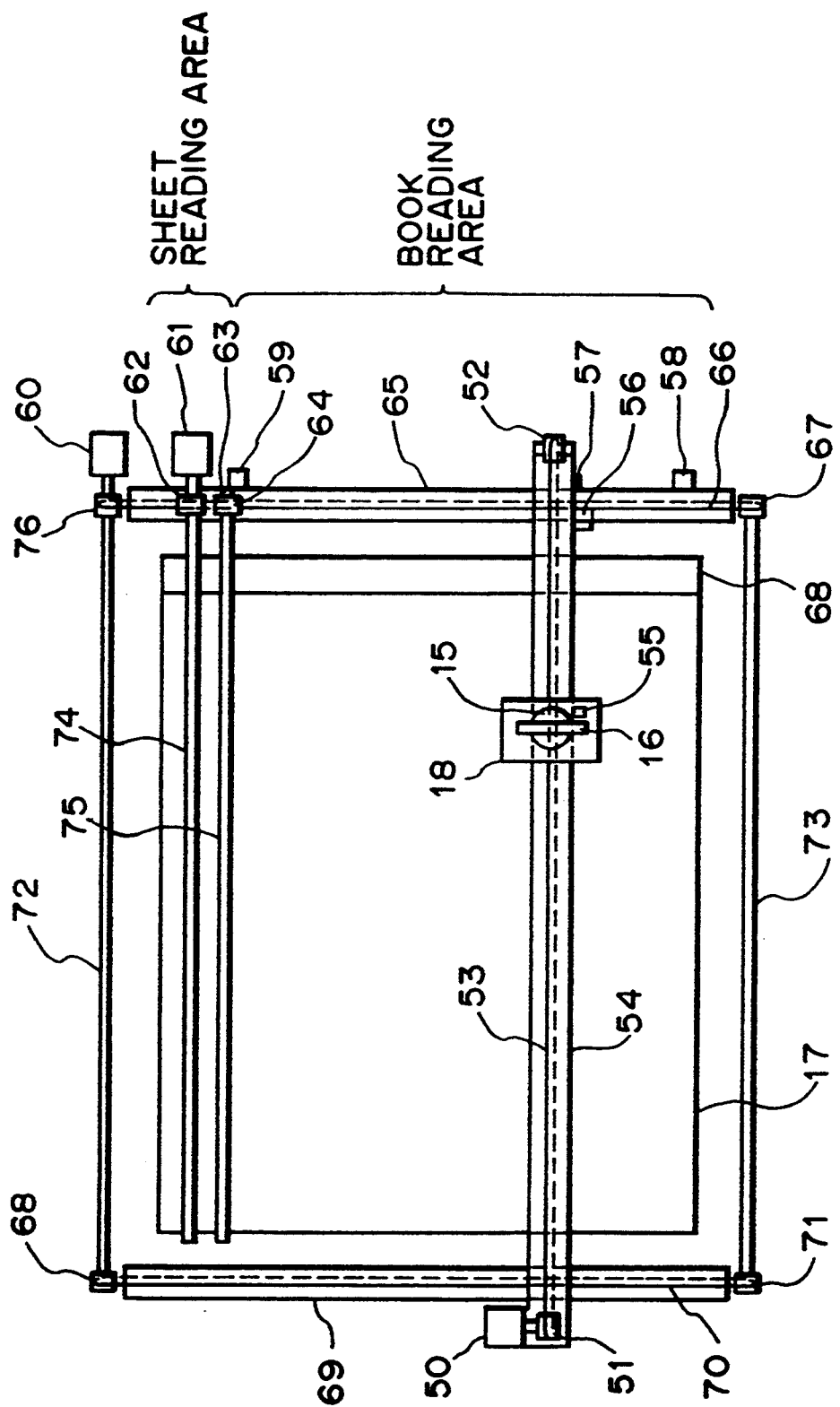
FIG. 4 is a diagram showing the mechanism within a scanner according to the first embodiment.

FIG. 4 is a diagram showing the mechanism within the scanning section 1 according to the first embodiment.

A CCD unit 18 is composed of the CCD line sensor 16 and the lens 15, etc. The CCD unit 18 is driven on rail 54 by a drive system, for the main scanning direction, comprising a main-scanning motor 50, a pulley 51, a pulley 52 and a wire 53 secured to the rail 54, whereby the image of the original on the glass platen 17 is read in the main scanning direction. A light-shield 55 and a home-position sensor 56 are used for positional control when the CCD unit 18 is moved to the home position on the main scan. The home position is located in a correction area 68.

The rail 54 is placed upon rails 65, 69 and is moved by a drive system, which is for the subordinate scanning direction, comprising a subordinate-direction scanning motor 60, pulleys 67, 68, 71, 76, shafts 72, 73 and wires 66, 70. A light shield 57 and home-position sensors 58, 59 are used for positional control when the rail 54 is moved to respective subordinate-scanning home positions in the book mode, which is for reading a book or the like placed upon the glass platen 17.

A sheet feeding motor 61, sheet feeding rollers 74, 75, pulleys 62, 64 and a wire 63 constitute a mechanism for feeding an original in the form of a sheet. This mechanism is for feeding, in prescribed incremental amounts by means of the sheet feeding rollers 74, 75, a sheet original placed face-down on the glass platen 17.

Figure 5:
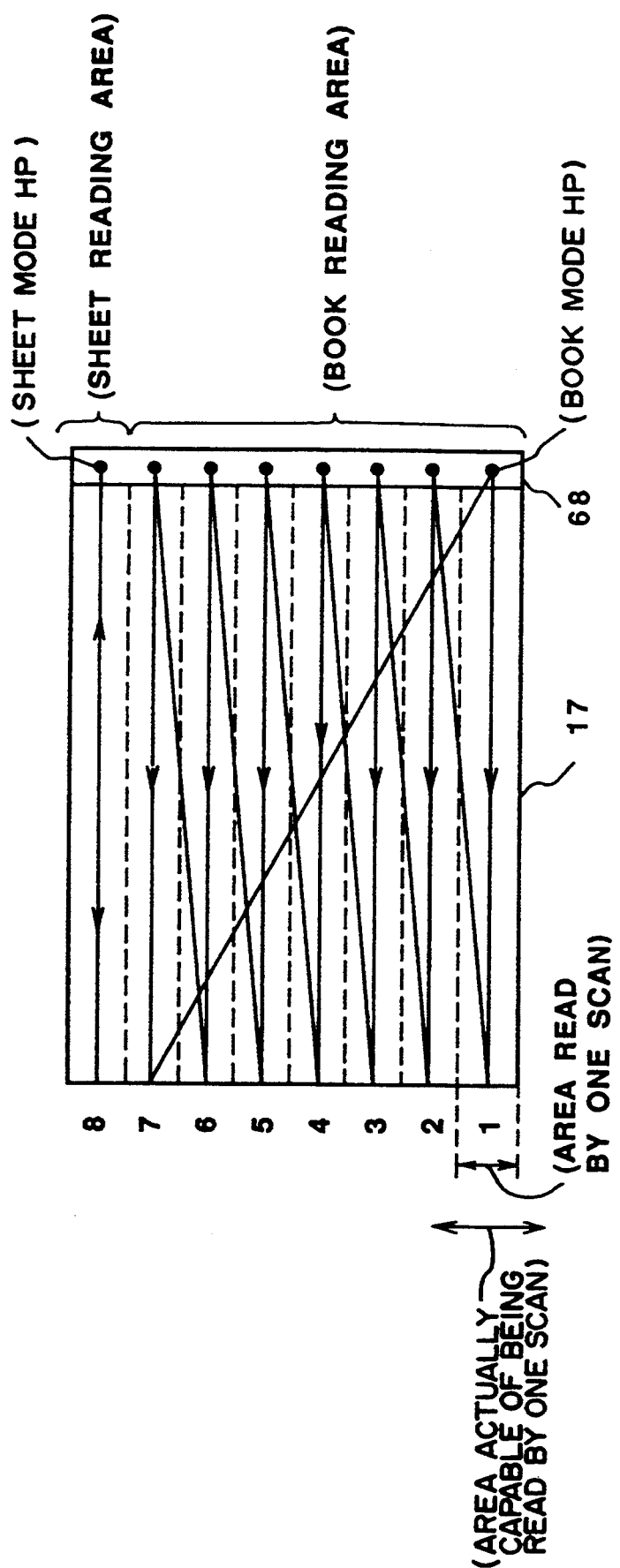
FIG. 5 is a diagram for describing a reading operation at the time of a book mode and sheet mode according to the first embodiment.

FIG. 5 is a diagram for describing a reading operation at the time of a book mode and sheet mode according to the first embodiment.

In the book mode, the CCD unit 18 is moved to the book-mode home position (indicated by "Book Mode HP" in FIG. 5), which is located in the correction area 68. From this position, the CCD unit 18 starts to read the entire surface of the original placed upon the glass platen 17.

Before the original is scanned, parameters necessary for such processing as a shading correction, black-level correction and color correction are set within the correction area 68. Thereafter, scanning in the main scanning direction is started by the mainscanning motor 50 in the direction indicated by the arrows. When reading of the area indicated by ① ends, the main-scanning motor 50 is reversed and the subordinate-scanning motor 60 in driven in the subordinate-scanning direction to effect movement to the correction area 68 of area ②. Next, if necessary, processing such as the shading correction, black-level correction and color correction is performed in the same manner as in the main scanning of area ①, and then the reading of area ② is performed.

By repeating the scanning described above, the entire surface of areas ① through ⑦ is read. After the reading of area ⑦ ends, the CCD unit 18 is again returned to the book-mode home position.

In this embodiment, the glass platen 17 must actually be scanned a greater number of times in order for an original of maximum size A2 to be read. However, this procedure is omitted from the discussion in order to facilitate an understanding of operation.

In the sheet mode, the CCD unit 18 is moved to the sheet-mode home position ("Sheet Mode HP" in FIG. 5) to repeatedly read area ⑧ of the sheet original while the sheet feeding motor 61 is operated intermittently, thereby reading the entire surface of the sheet original.

Before the original is scanned, processing such as a shading correction, black-level correction and color correction is executed within the correction area 68, after which scanning in the main scanning direction is started by the main-scanning motor 50 in the direction indicated by the arrows. When one-way reading of the area ⑧ ends, the main-scanning motor 50 is reversed and the sheet feeding motor 61 in driven to move the sheet original a predetermined amount in the subordinate-scanning direction. A similar operation is then repeated to read the entire surface of the sheet original.

If the reading operation described above is performed at a magnification of 1X, the area read by the CCD unit 18 actually is a larger area, as illustrated in FIG. 5. The reason for this is that the digital color copier of this embodiment incorporates a zoom function for enlargement or reduction. More specifically, the area capable of being recorded on by the recording head 37 is fixed at 256 bits for one recording operation, as mentioned above. Therefore, in a case where a 50% reduction is to be performed, for example, image information of an area of at least 512 bits, which is twice the number of bits, is required. Accordingly, the scanning section 1 incorporates a function for reading and outputting the image information of any image area by a single main-scanning reading operation.

Figure 6:
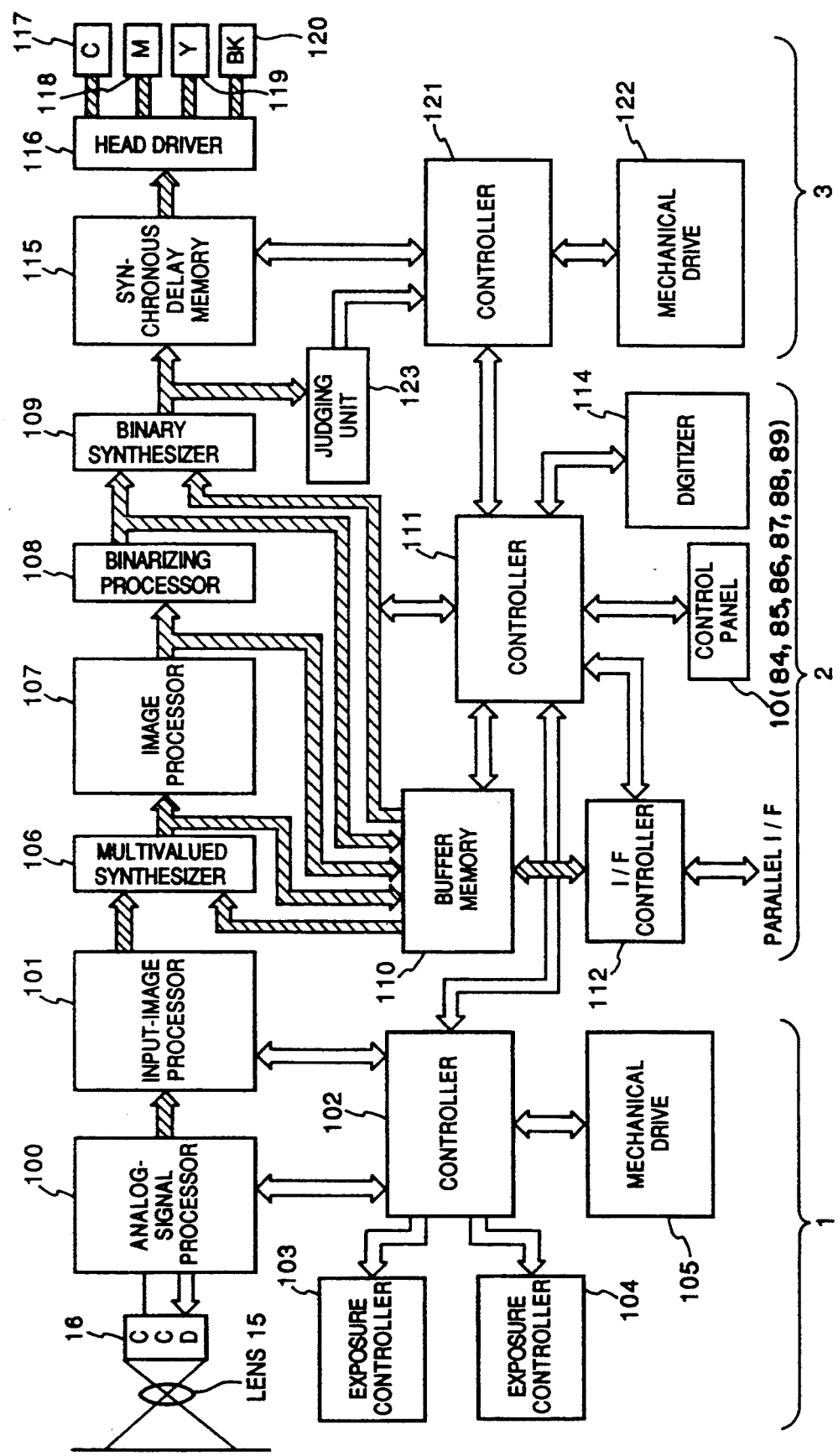
FIG. 6 is a block diagram showing the construction of a digital color copier according to the first embodiment.

FIG. 6 is a block diagram showing the construction of a digital color copier according to the first embodiment. Controllers 102, 111, 121 are control circuits for controlling the scanning section 1, controlling unit 2 and printing section 3. Each controller is constituted bV a microcomputer, a program ROM, a data memory and a communication circuit, etc. The controller 102 is connected to the controller 111 by a communication line, and the controller 111 is connected to the controller 121 by a communication line. In response to a command from the controller 111, the controllers 102, 121 operate. In other words, a so-called mast-slave control configuration is adopted.

In a case where the apparatus operates as a color copier, the controller 111 operates in accordance with an input command from a control panel 10 and from a digitizer 114.

The control panel 10 employs a liquid crystal (LCD display 84) as a display unit, and the front side thereof is equipped with a touch panel 85 comprising transparent electrodes so that designation of color, designation of an editing operation, etc., may be selectively performed. In addition, the control panel 10 is provided with independent keys having a high frequency of use, such as keys relating to operation. For example, these keys include a start key 87 for designating the start of the copying operation, a stop key 88 for designating stopping of the copying operation, a reset key 89 for restoring the operation mode to a standard state, and a projector key 86 for selecting a projector, which are not shown.

Furthermore, the control panel 10 is provided with a mode selection key for selecting one of a first and second mode, the first mode for processing image data read by the CCD line sensor 16, and the second mode for processing image data inputted by the I/F controller 112.

The digitizer 114 is for inputting position information indicating an area to undergo trimming processing, masking processing or color-conversion processing. The digitizer 114 is connected as an option if complicated editing processing is required.

The controller 111 is for controlling the I/F controller 112, which is a universal parallel interface such as an IEEE-488, namely a so-called GP-IB interface. The controller 111 is adapted in such a manner that input/output of image data with an external device as well as mode control by an external device can be performed via this interface.

Furthermore, the controller 111 controls a multivalued synthesizer 106, an image processor 107, a binarizing processor 108, a binary synthesizer 109 and a buffer memory 110, which are for subjecting an image to a variety of processing.

The controller 102 controls a mechanical drive unit 105 which drives and controls the mechanism of the scanning section 1 described above, an exposure control unit 103 which controls exposure of a lamp for reflective reading of an original, and an exposure control unit 104 which controls exposure of a halogen lamp 90 when a projector is used. The controller 102 controls also an analog-signal processor 10 and an input-image processor 101, which subject an image to various processing.

The controller 121 controls the mechanical drive 105 which drives and controls the mechanism of the printing section 3 described above, and a synchronous delay memory 115 for absorbing disparities in time in the mechanical operation of the printing section 3 and for correcting a delay due to the arrangement of the mechanisms of recording heads 117 through 120.

The image processing blocks of FIG. 6 will now be described in connection with the flow of image processing.

The image formed on the CCD line sensor 16 is converted into an analog electric signal by the CCD 16. The image information resulting from the conversion is serially processed in the manner red→green→blue for each pixel and the processed results are inputted to the analog-signal processor 100. The analog-signal processor 100 subjects the information to an analog-to-digital conversion after performing sampling and holding, dark-level correct ion and dynamic-range control for each of the colors red, green and blue. The information is thus converted into a serial multivalued digital image signal (in this embodiment, a bit length of eight bits for each color), and the image signal is outputted to the input-image processor 101.

In the input-image processor 101, the correction processing necessary in the reading system, such as a shading correction, color correction and γ-correction, is performed, with the signal remaining in the form of a serial multivalued digital image signal.

The multivalued synthesizer 106 in the controlling section 2 selects one of the serial multivalued digital image signal sent from the scanning section 1 and the serial multivalued digital image signal sent via the parallel I/F from the expanded device (a still video camera, a host computer, etc.), or performs synthesizing processing both of them. The selected image data is sent to the image processor 107 or the buffer memory 110 in the form of a serial multivalued digital image signal. The synthesizing processing includes one synthesis by multiplication of both of the serial multivalue of digital image signals and another synthesis by giving prior to one of the multivalued digital image signals.

The image processor 107 is a circuit for performing smoothing processing, edge emphasis, black extraction and masking processing, which is for a color correction of the recording ink used in the recording heads 117–120. Each of the serial multivalued digital image signals Y, M, C and K outputted by the image processor 107 is inputted to the binarizing processor 108 or the buffer memory 110. The binarizing processor 108 is a circuit for binarizing the serial multivalued digital image signals Y, M, C and K respectively and is capable of selecting pure binary values based upon a fixed slice level or pseudo-half-tone processing based upon the dither method. Here the serial multivalued digital image signals Y, M, C and K are converted into binary parallel image signal of four colors Y, M, C and K. Four-color image data (Y, M, C and K) is sent to the binary synthesizer 109, or the buffer memory 110. The binary synthesizer 109 selects one of the binary parallel image signal of four colors Y, M, C and K sent from the buffer memory 110 and the binary parallel image signal of four colors Y, M , C and K sent from the binary processor 108, or combines both of the signals and forms a binary parallel image signal of four colors Y, M, C and K. The buffer memory 110, which is for performing input/output of a multivalued image and binary image via the parallel I/F, and possesses memories for four colors.

According to the present embodiment, the below data input/output can be made possible via the I/F controller 112 between the digital color copier and an external device (a host computer etc. ) . Namely, a kind of data includes multivalued image signals R, G and B ①, multivalued image signals Y, M, C and K ②, and binary image signals Y, M, C and K ③. Data from the external device is stored in the buffer memory 110, and inputted in the multivalued synthesizer 106 or the image processor 107(a) , the binarizing processor 108(b), and the binary synthesizer 109(c). In the similar manner, each data of ①, ②, and ③ is stored in the buffer memory 110, and outputted to the external device.

The synchronous delay memory 115 of the printing section 3 is a circuit for absorbing disparities in time in the mechanical operation of the printing section 3 and for correcting a delay due to the arrangement of the mechanisms of recording heads 117 through 120. In addition, the memory 115 internally generates the timing necessary for driving the recording heads 117 through 120. A head driver 116 is an analog drive circuit which drives the recording heads 117 through 120. The head driver 116 internally generates signals that are capable of directly driving the recording heads 117 through 120. The recording heads 117 through 120 jet the inks of the colors cyan, magenta, yellow and black to record an image on the recording paper.

Figure 7:
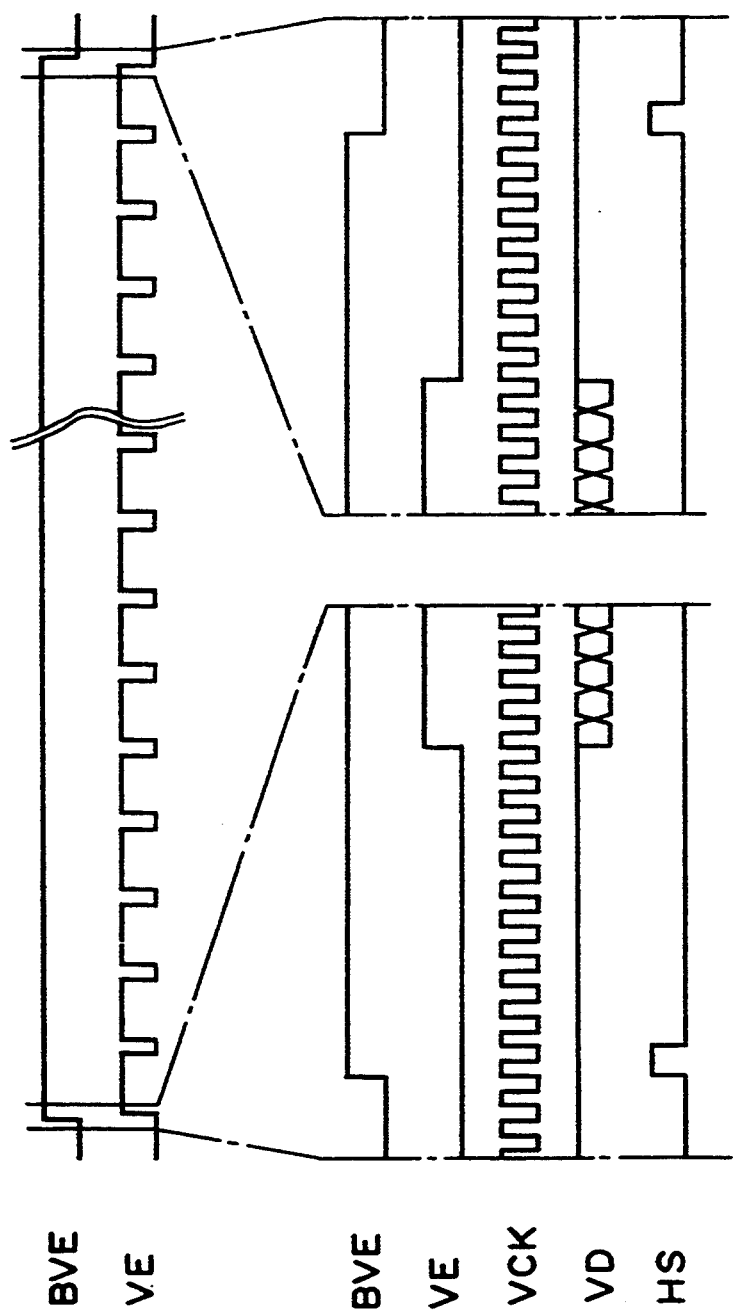
FIG. 7 is a timing chart of an image between circuit blocks described in FIG. 6.

FIG. 7 is a timing chart of an image between the circuit blocks described in FIG. 6.

A signal BVE indicates the effective interval of the image every scan of the main-scan reading operation described in connection with FIG. 5. A full frame of the image is outputted by outputting the signal BVE a plurality of times.

A signal VE indicates the effective interval of the image every line read by the CCD line sensor 16. The signal VE is rendered effective only when the signal BVE is effective.

A signal VCD is a clock signal for forwarding image data VD. Both the signal BVE and the signal VE vary in synch with the signal VCK.

A signal HS in used in a case where the signal VE repeatedly exhibits effective and ineffective intervals discontinuously while one line is being outputted. The signal HS is unnecessary in a case where the signal VE is effective continuously while one line is being outputted. The signal HS is a signal indicating the start of image output of one line.

Numeral 123 denotes an image judging unit. The binary image data of the colors C, M, Y, Mk sent from the binary synthesizer 109 is applied to the synchronous delay memory 115, where the delay between heads is corrected. Thereafter, the binary image data of the colors C, M, Y, Mk is supplied also to the image judging unit 123 at the same time that the corrected data is printed and recorded by the recording heads 117 through 120. The image judging unit 123 performs a real-time comparison of the supplied binary image data and specific image data registered in advance. In a case where there is a high degree of similarity with image data corresponding to a specific original, as will be described below, the image judging unit 123 sends a decision signal to the controller 121 to suspend the printing operation. At this time the controller 121 naturally notifies the controllers 102, 111 of this event.

In the case of a digital full-color copier of the kind illustrated in this embodiment, the arrangement is such that the binary image data is capable of being printed out directly via a host computer and through the intermediary of the I/F controller 112 and buffer memory 110 . Therefore, in order to prevent the printing of specific image data through this path, the image judging unit 123 must be adapted to make this decision from the binary image data which prevails immediately prior to printing.

Figure 8:
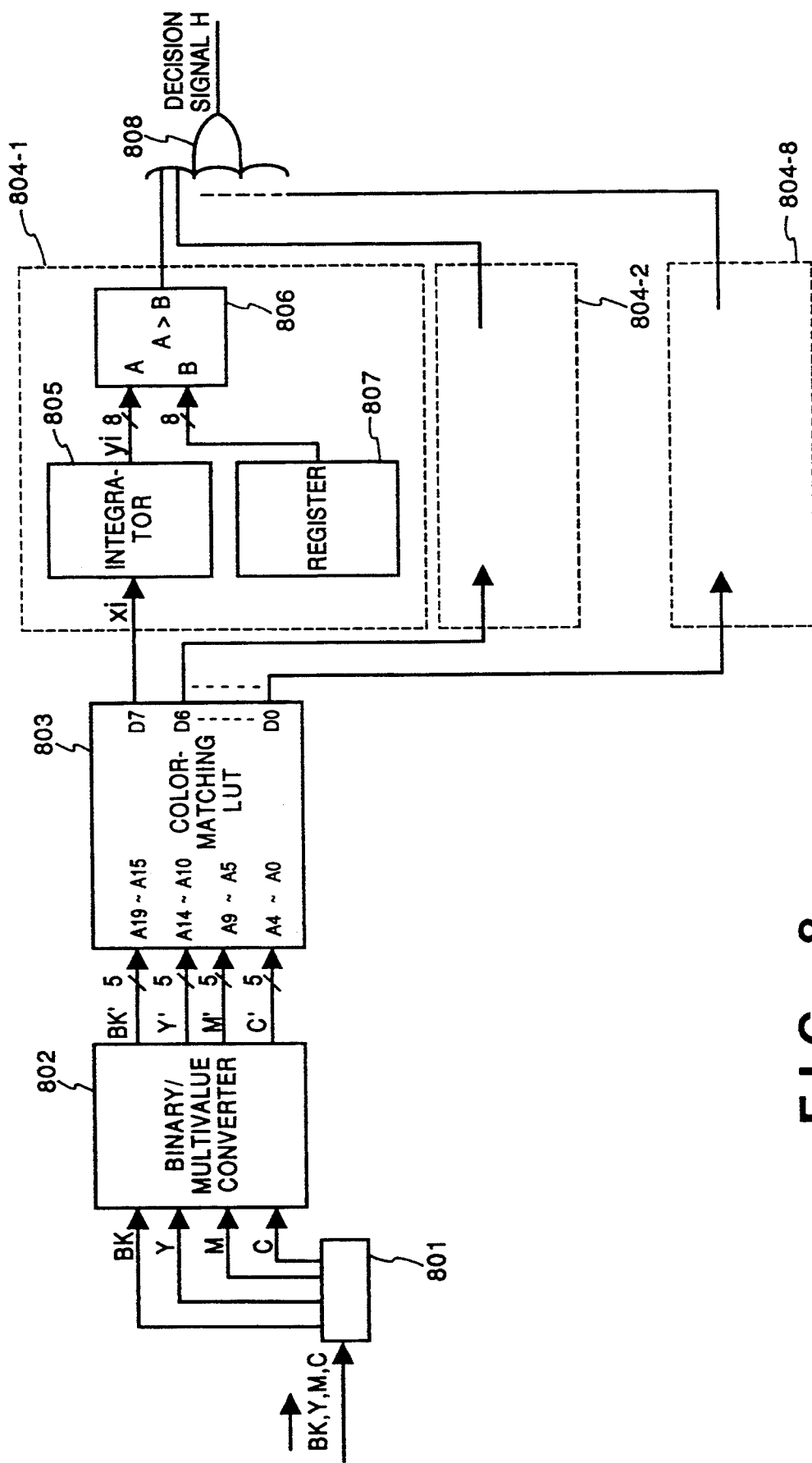
FIG. 8 is a block diagram showing the construction of an image judging unit according to the first embodiment.

FIG. 8 is a block diagram showing the construction of the image judging unit according to the first embodiment. Numeral 801 denotes a shift register for converting the pixels signals of the serially delivered colors C, M, Y, Bk into parallel data . The C, M, Y, Bk serial binary image data is converted into parallel signals by a timing controller, not shown.

Numeral 802 denotes a binary/multivalue converter circuit for converting the binary image data, which has been subjected to the parallel conversion by the shift register 108, into multivalued image data of five bits per color. A bit width of four bits is adopted for the following reasons: Specifically, the bit width is set while requiring that the processing load on the circuitry following the converter circuit be alleviated and that a specific original be detectable with a sufficient degree of certainty. In addition, the image data subjected to the binary-to-multivalue conversion is so converted by being thinned out in such a manner that one pixel is multivalue-converted every four pixels. This also is done for the reason mentioned above.

Numeral 803 designates color-matching look-up table (hereinafter referred to as a "color-matching LUT") constituted by a ROM which performs the matching of colors, which are the image characteristics of specific original of a plurality of types. Numerals 804-1, 804-2, 804-8 denote color judging circuits each constituted by the same software. Each color judging circuit includes an integrator 805, a comparator 806 and a register 807 and determines whether a specific original is present in the image data. Numeral 808 designates an OR gate. In a case where one or more of the color judging circuits 804-1, 804-2, ..., 804-8 judges that the specific original is present in the image data, the OR gate 808 delivers the output "1" of this judging circuit as a decision signal H.

The details of the binary/multivalue converter circuit 802 will now be described.

Figures 9, 10, 11:
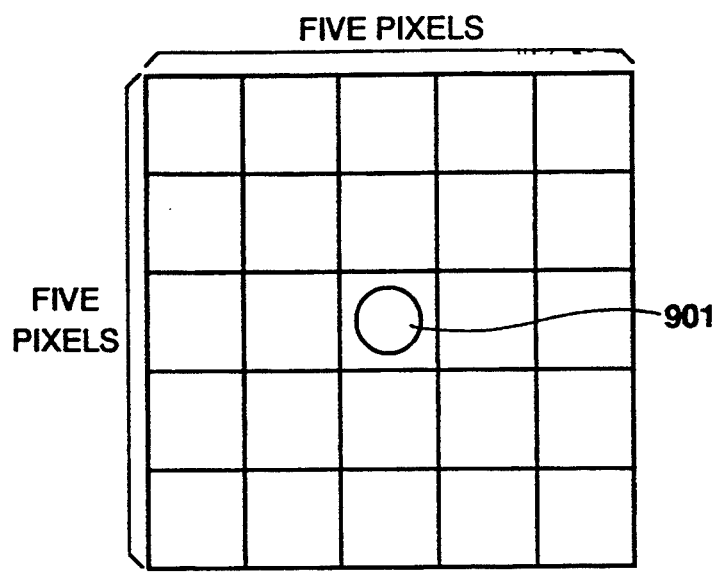
FIG. 9 is a diagram for describing the processing performed by a binary/multivalue converter according to the first embodiment.
FIG. 10 is a diagram for describing the processing performed by a binary/multivalue converter according to the first embodiment.
FIG. 11 is a diagram for describing the processing performed by a binary/multivalue converter according to the first embodiment.

FIGS. 9 through 11 are diagrams for describing the processing performed by the binary/multivalue converter 802 according to the first embodiment. As shown in FIG. 9, area processing is applied to the inputted binary image data. In this embodiment, a 5×5 matrix of the kind illustrated in FIG. 9 is used to determine the total sum of each of the cells in which the image data is present, thereby obtaining the density level of a pixel of interest shown at 901 in FIG. 9. At this time a weighting coefficient is set for each cell. The value which has given by multiplication using this weighting coefficient is the data of each cell.

As shown in FIG. 10, in which xi, yj represent the weighting coefficients of the matrix, a density level e of a pixel of interest is determined by the following equation:

$$e = \sum_{i=1}^{5} \sum_{j=1}^{5} (x_i y_j \times a_{i,j}) \quad (1)$$

where a represents the image data and is 1 or 0, since the image is a binary image.

The weighting coefficients of this embodiment are illustrated in FIG. 11. In this case, the density level is a decimal number (61) when the density is maximum. In terms of a binary number, all densities can be expressed by a data width of five bits.

Figure 12:
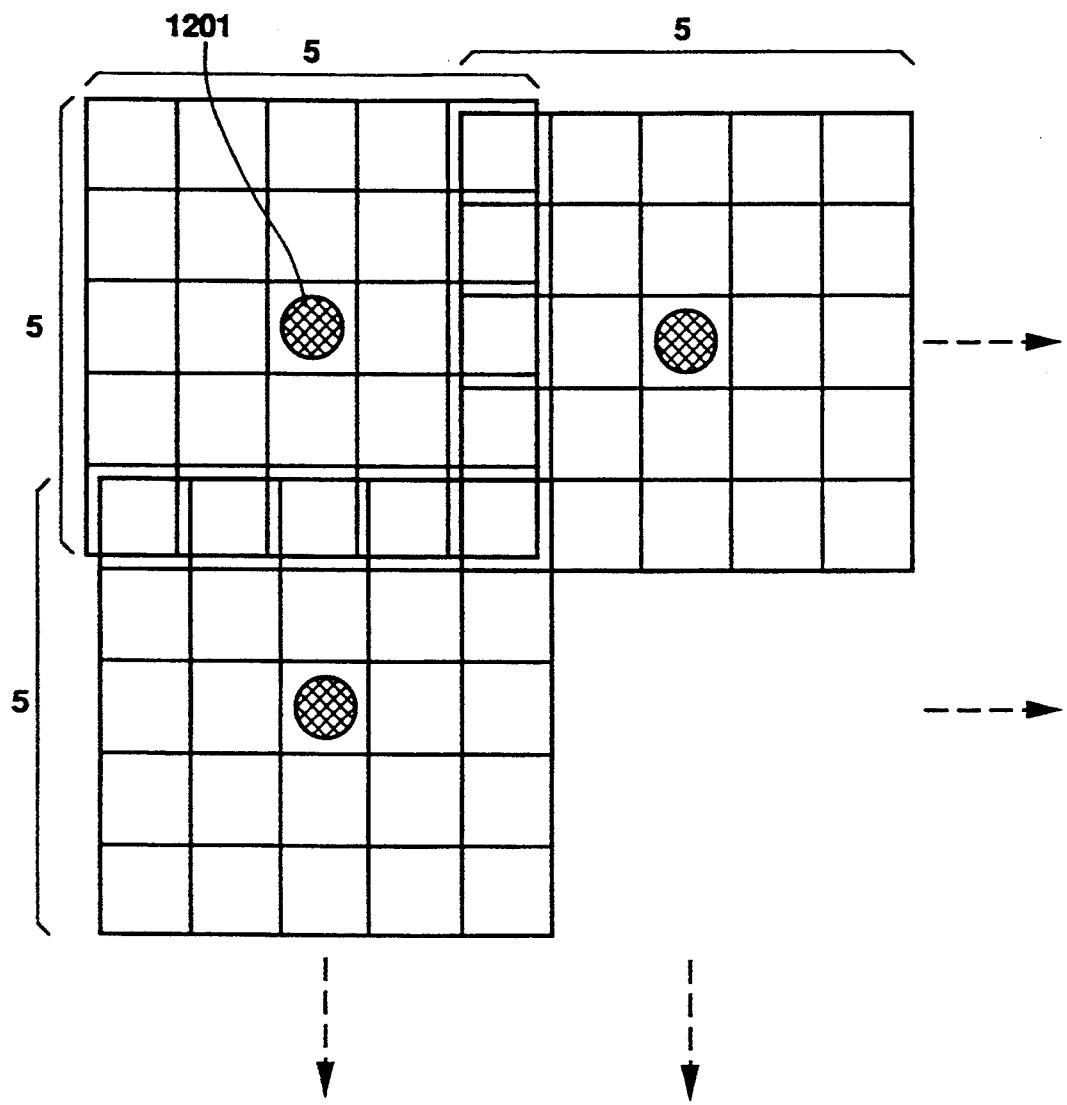
FIG. 12 is a diagram for describing a method of thinning out image data and subjecting the image data to a multivalued conversion according to the first embodiment.

FIG. 12 is a diagram for describing a method of thinning out image data and subjecting the image data to a multivalued conversion according to the first embodiment. In FIG. 12, a pixel of interest 1201 is subjected to a multivalue conversion, after which the image data to be subjected to this conversion next is multivalue-converted using image data obtained by jumping four pixels ahead as the pixel of interest.

The foregoing processing executed by the binary/multivalue converter 802 possesses independent circuitry for each of the colors C, M, Y and Bk. The image data for each of the colors C, M, Y and Bk thus converted from a binary value to a multivalue enters the color-matching LUT 803 of FIG. 8.

The color-matching LUT 803 investigates color distribution with regard to specific originals of eight types in advance and holds the results of judgment, these results indicating whether the color of a pertinent pixel coincides with a color of the specific originals.

More specifically, the color-matching LUT 803 has address lines of 20 bits to which the pixel data of each of the colors C, M, Y, Bk multivalue-converted by the converter 802 enters five bits at a time. The data-output lines of the color-matching LUT 803 are of eight bits, each single bit corresponding to one type of specific original. A total of eight types of specific originals are judged.

Figure 13:
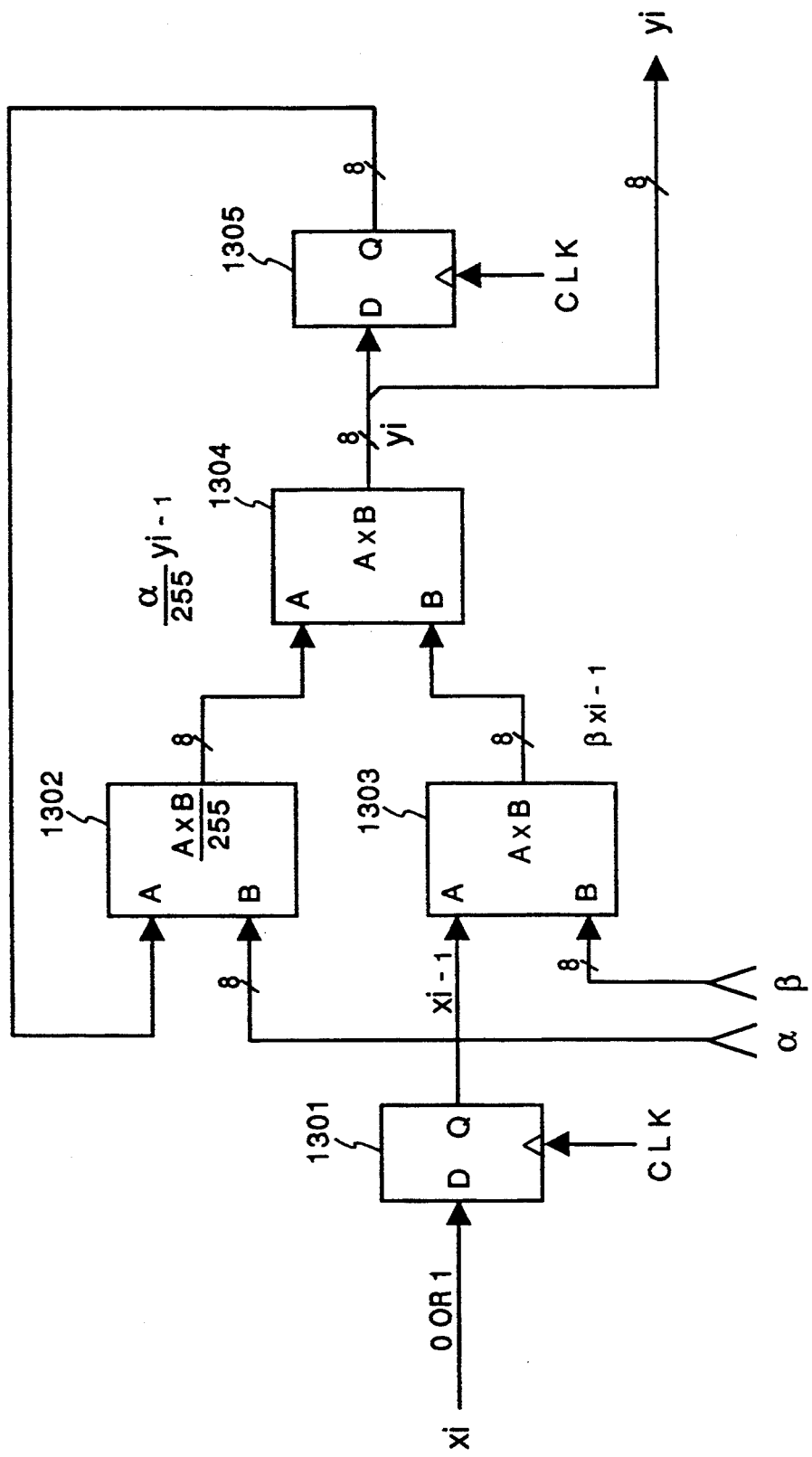
FIG. 13 is a block diagram illustrating the construction of an integrator according to the first embodiment.

FIG. 13 is a block diagram illustrating the construction of the integrator 805 according to the first embodiment. In FIG. 13, numerals 1301, 1305 denote flip-flops which hold data at the timing of the leading edge of a clock signal CALK. Numeral 1302 denotes a multiplier to which two eight-bit signals (A, B) are inputted. The multiplier 1302 multiplies these signals together and outputs an eight-bit signal $$\left(\frac{A \times B}{255}\right)$$

as the result. Numeral. 1303 denotes a multiplier to which a one-bit input signal (A) and an eight-bit input signal (B) are applied . The multiplier 1303 multiplies these signals together and outputs an eight-bit signal (A×B) as the result . Numeral 1304 denotes an adder to which two eight-bit signals (A, B) are inputted. The multiplier 1304 adds these signals together and outputs an eight-bit signal (A+B) as the result.

Accordingly, in the integrator 805 of this embodiment, an eight-bit output signal Yi is expressed by the following equation when a binary input signal $x_1$ is applied:

$$Yi = (\alpha/255)yi - 1\beta \cdot x_{i-1} \qquad (2)$$

where $\alpha$ and $\beta$ represent constants that have been preset. The various characteristics of the integrator 805 are decided by the sizes of these values.

A case in which $\alpha = 247$, $\beta = 8$ hold will be described as one example.

Figure 14:
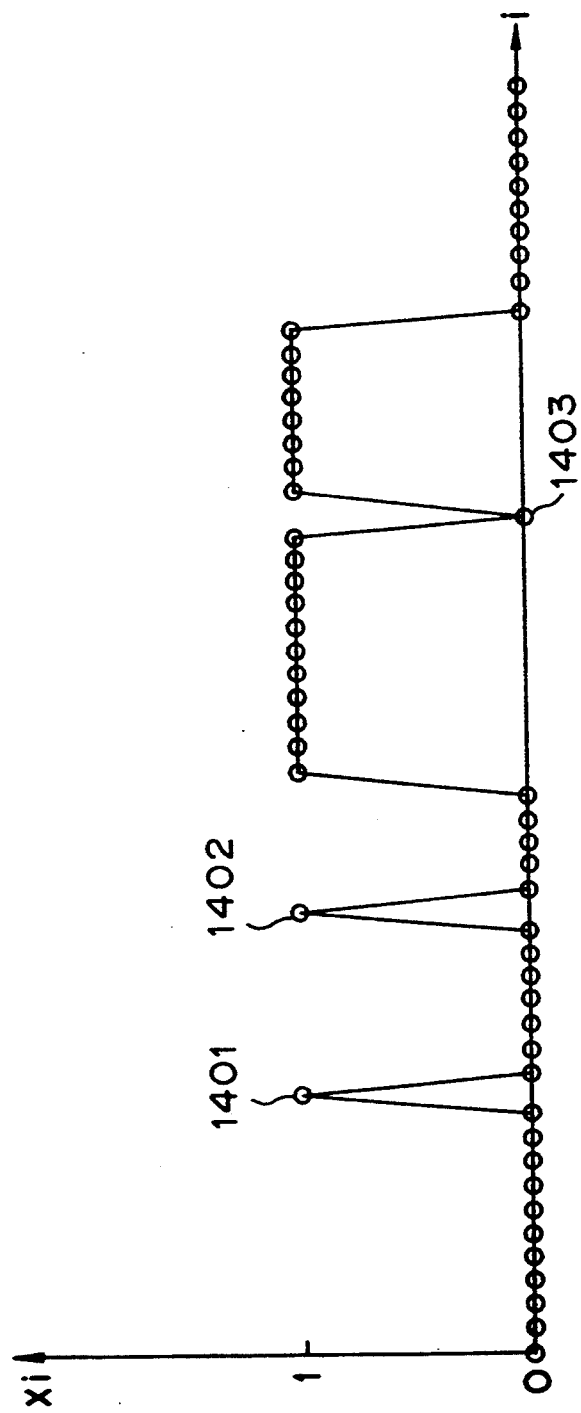
FIG. 14 is a diagram showing an example of the input/output of the integrator according to the first embodiment.
Figure 15:
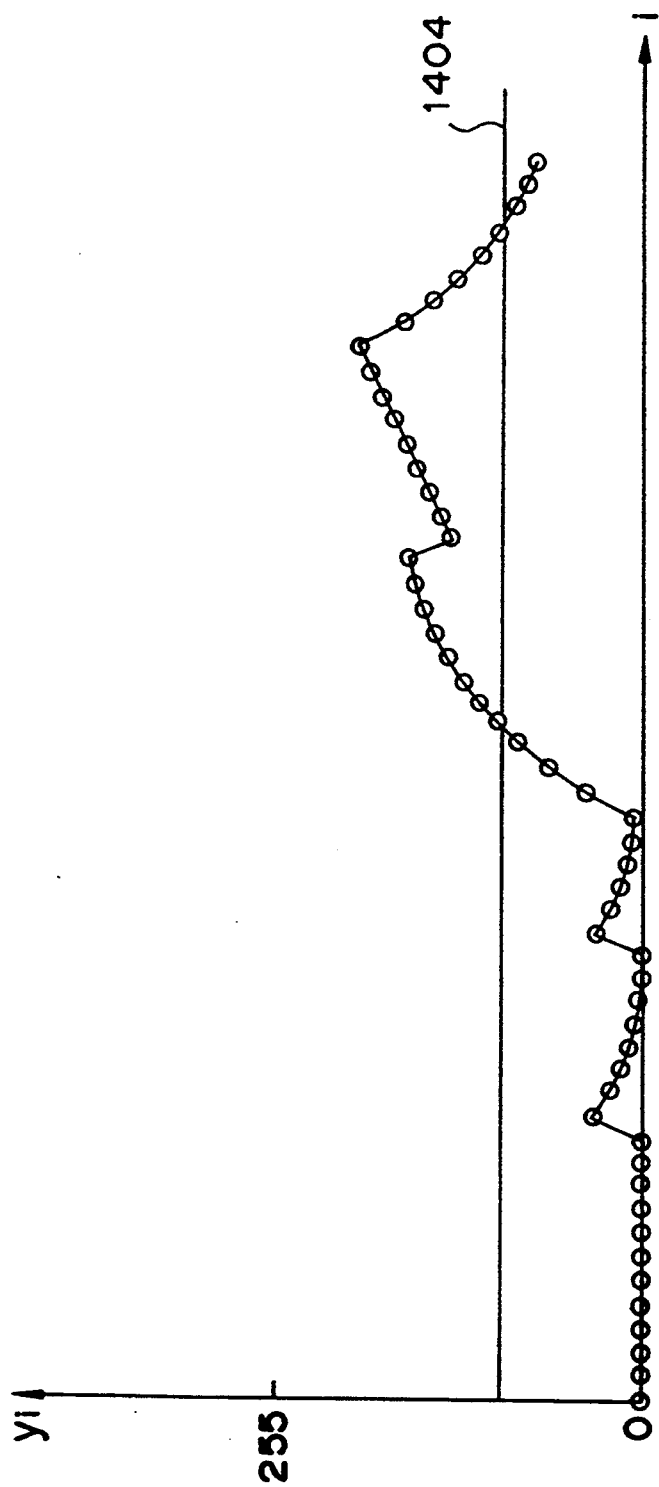
FIG. 15 is a diagram showing an example of the input/output of the integrator according to the first embodiment.

FIGS. 14 and 15 are diagrams showing an example of the input/output of the integrator 805 according to the first embodiment. An output Yi of the kind shown in FIG. 15 is outputted in response to an input $x_{i-1}$ of the kind shown in FIG. 14.

An input which is "1" despite the fact that almost all values peripheral thereto are "0", as in the manner of points 1401, 1402, is considered to be noise. Similarly, an input which is "0" despite the fact that almost all values peripheral thereto are "1", as in the manner of point 1403, is considered to be noise. This is processed by the integrator 805, an appropriate threshold value of the kind indicated at 1404 is set in the register 807 of FIG. 8, and the output Yi of the integrator is binarized based upon this threshold value, thereby making it possible to eliminate the noise.

Figure 16:
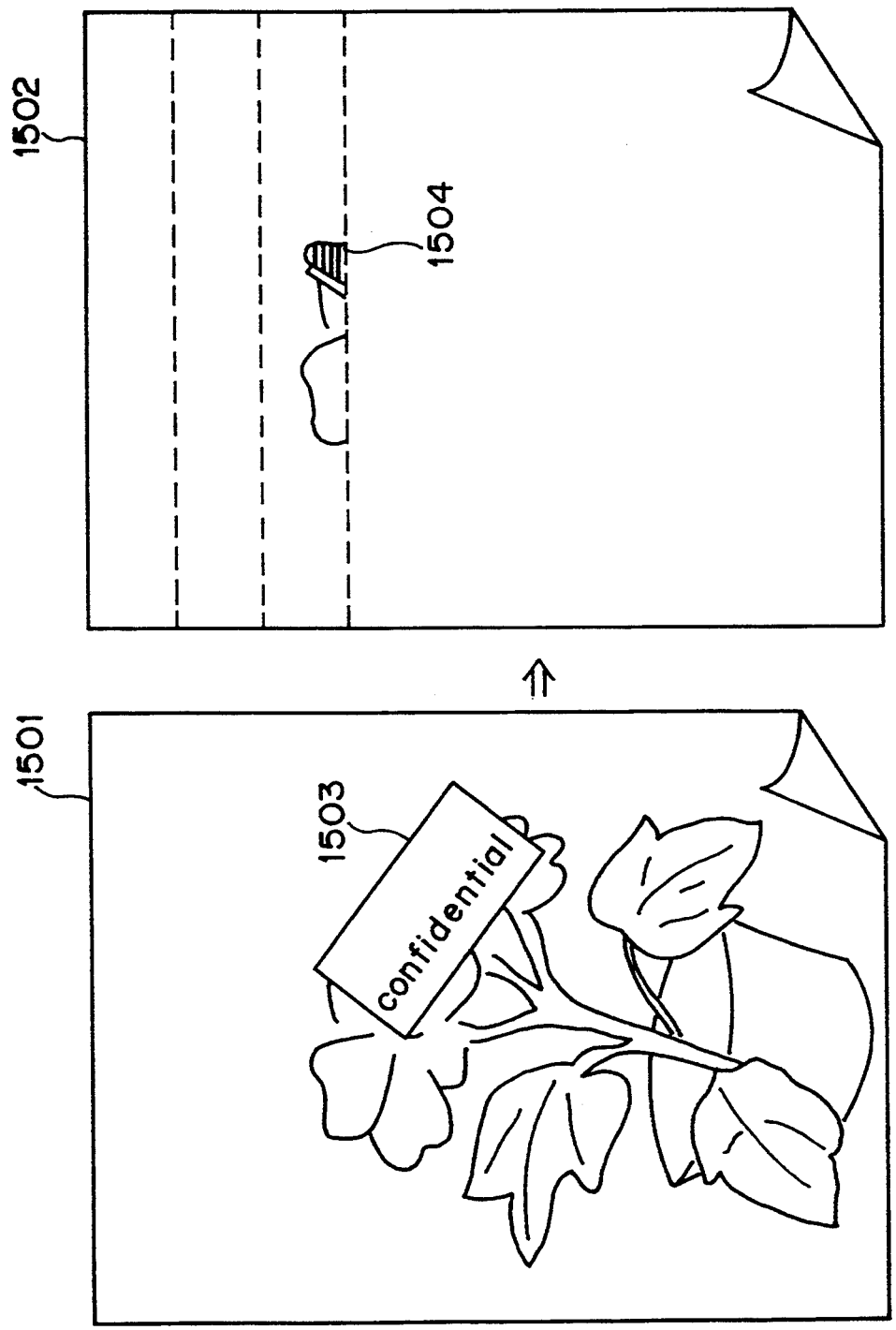
FIG. 16 is a diagram showing an example of processed results according to the first embodiment.

FIG. 16 is a diagram showing an example of processed results according to the first embodiment. In FIG. 16, numeral 1501 denotes an original in a part of which there resides a specific original 1503 to be judged by the apparatus. Numeral 1502 represents outputted results in a case where the original has been copied in this apparatus. This indicates a case in which the fact that the original is a specific original has been detected at a point 1504 in the third scan in the portion corresponding to the specific original 1503. As soon as the specific original is detected, scanning and printing of the original are suspended. As a result, the specific original 1503 cannot be copied normally .

Method of for prohibiting copying includes, for example, a method for stopping transmitting printing data and a method for cutting off a circuit for printing.

It goes without saying that similar processing is executed not only when an original is copied but also when printing is performed based upon multivalued image data or binary image data inputted from a host computer or external device, thereby making it possible to prevent (impede) the printing of a specific image.

In accordance with the first embodiment, as described above, judgment processing for determining whether a specific original is present based upon binary image data can be executed by a single judging unit, even if a printer is a binary printer. This makes it possible to prevent copying of a specific original or printing of a specific image inputted from an external device such as a host computer.

Further, the matrix size and the weighting coefficients of the binary/multivalue converter 802 illustrated in this embodiment do not place a limitation upon the invention. These can be set at will in conformity with the type of specific original and the characteristics of the binary printer. It goes without saying that the bit width of the image data to be converted into multivalued data also is not limited to five pixels, as in this embodiment.

<Second Embodiment>

The types of specific originals judged can be set at will depending upon the capacity of the color matching LUT. The eight types illustrated in the first embodiment described above do not represent a limitation upon the invention. In the second embodiment, components other than the image judging unit are similar to those of the first embodiment and need not be described again.

Figure 17:
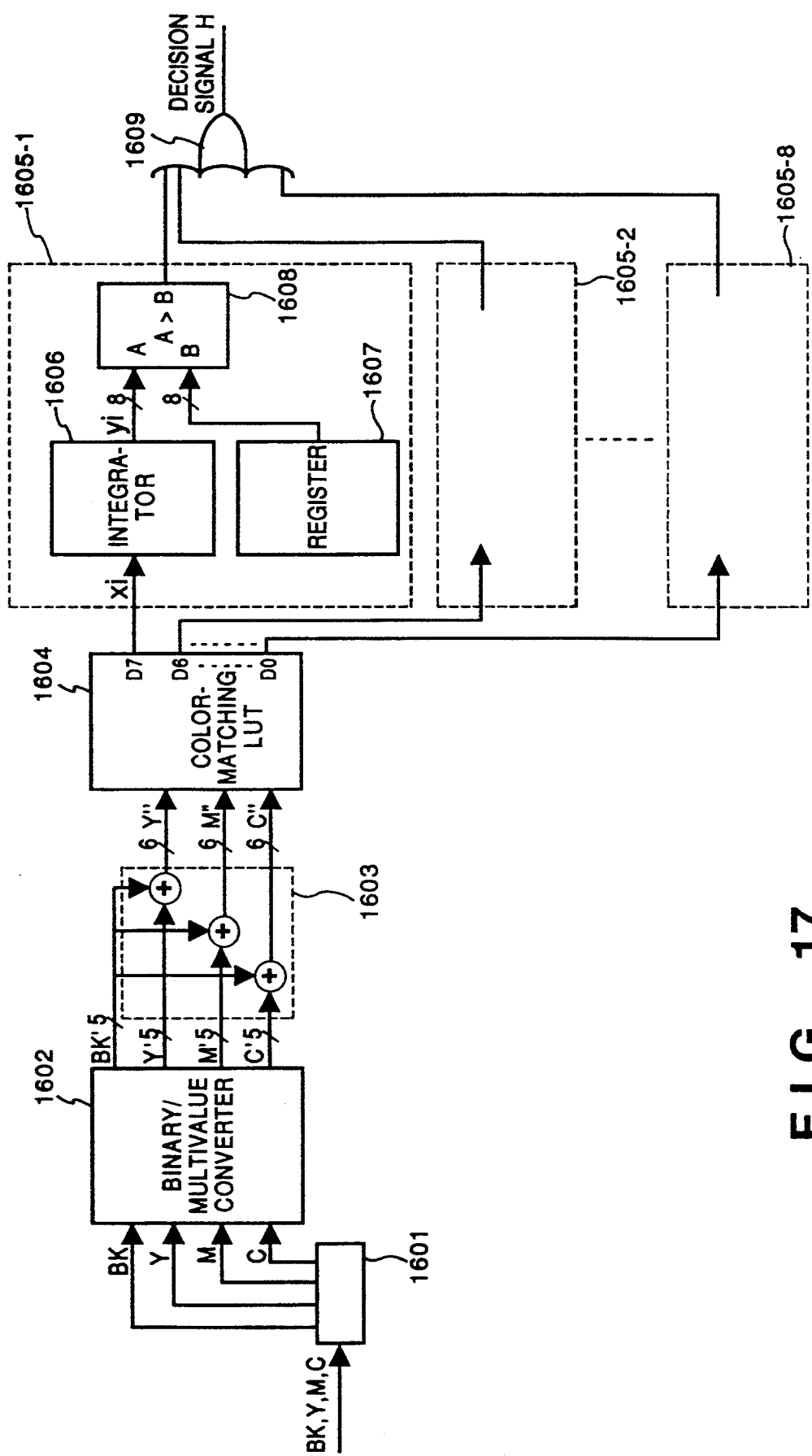
FIG. 17 is a block diagram illustrating the construction of an image judging unit according to a second embodiment of the invention.

FIG. 17 is a block diagram illustrating the construction of an image judging unit according to the second embodiment of the invention. Numeral 1601 denotes a shift register, 1602 a binary/multivalue converter, 1603 a Bk adder, 1604 a matching LUT, 1605-1 through 1605-8 color judging circuits, and 1609 an OR gate. Numeral 1606 designates an integrator, 1607 a register, and 1608 a comparator.

This embodiment differs from that of FIG. 8 in that the Bk adder 1603 is provided between the binary/multivalue converter 1602 and the color-matching LUT 1604. With the exception of the color-matching LUT 1604, the functions of the image judging unit are the same as in FIG. 8. By adopting an arrangement in which the Bk' component from the multivalued data C', M', Y', Bk' obtained by the conversion in the binary/multivalue converter 1602 is added equivalently to C', M', Y', the ROM capacity of the color-matching LUT 1604 is reduced to ¼. This makes it possible to lower the cost of the hardware without sacrificing the certainty with which a specific original is detected.

The Bk adder 1603 adds five bits of each of the components C', M', Y' to five bit s of the Bk' component, and the result of addition has a maximum of six bits.

<Third Embodiment>

In the first embodiment, a specific original is judged from binary image data. However, this does not impose a limitation upon the invention. By way of example, the invention is applicable also to a low-tonality color-printer apparatus in which a density expression of four levels per color is possible using two bits of each of C, M, Y, Bk of one pixel.

Figure 19:
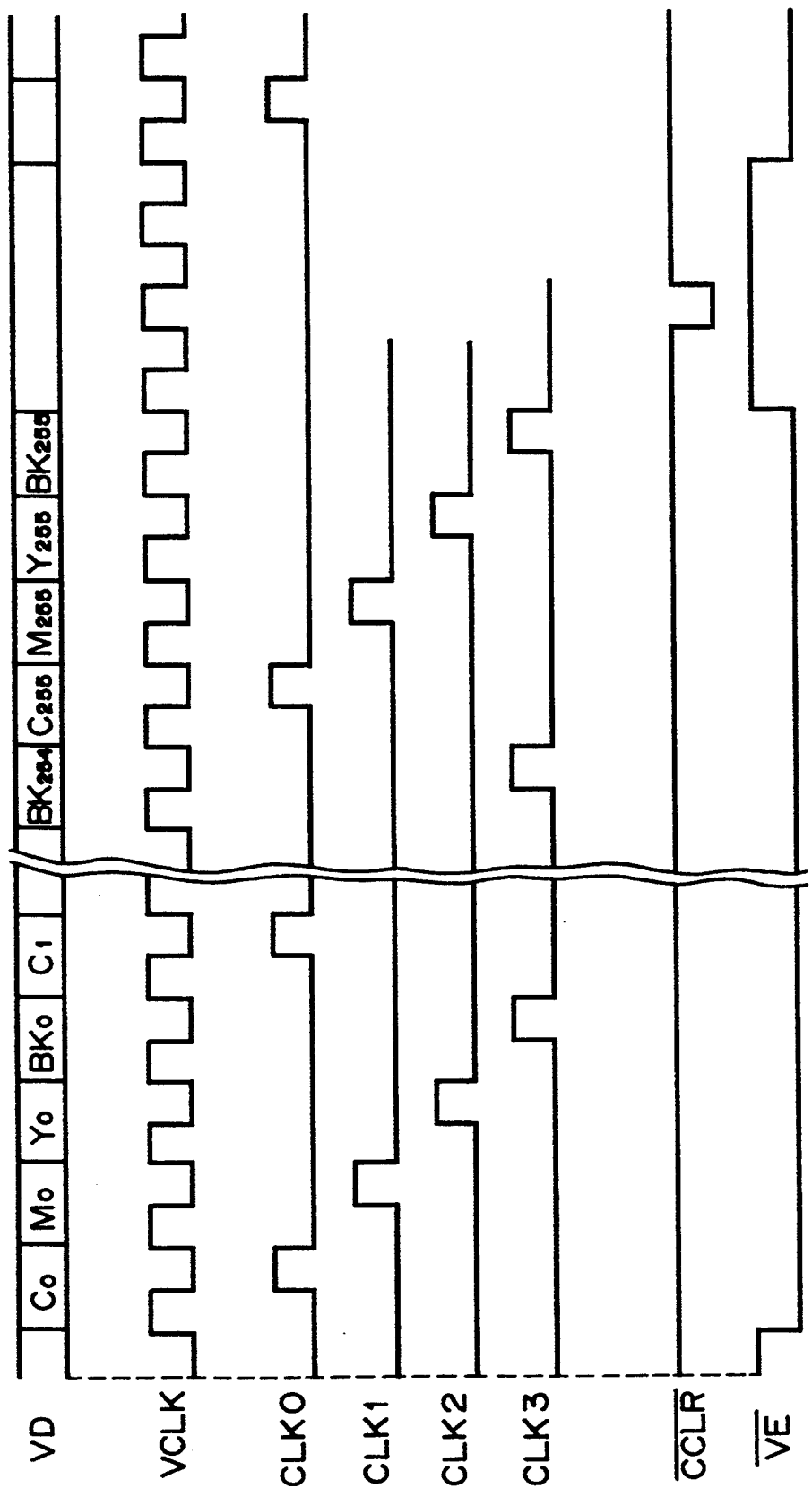
FIG. 19 is a timing chart of signals in the image judging unit shown in FIG. 18.

FIG. 18 is a block diagram showing the construction of a principal portion of the image judging unit according to a third embodiment of the invention, and FIG. 19 is a timing chart of signals in the image judging unit shown in FIG. 18.

In FIG. 18, numerals 1701-1 through 1701-4 denote counters for counting the number of pixels of data "1" in a predetermined period (1VE) with regard to each of the colors Bk, Y, M, C, respectively, and numerals 1702-1 through 1702-4 denote latch circuits for holding the values of the counts from the respective counters 1701-1 through 1701-4 and supplying multivalued image data to a color-matching look-up table 1703 at a predetermined timing (VE in FIG. 19). The color-matching look-up table 1703 carries out the above-described color matching based upon the inputted Bk', Y', M', C' data.

In FIG. 19, VD represents binary image data delivered serially in the order C, M, Y, Bk every pixel, VCLK represents a video clock, and CLK0~CLK3 are clocks for extracting the C, M, Y, Bk data from VD. Further, CCLR represents a signal for resetting the counter values in conformity with a video-enable signal. VE denotes the video-enable signal, which is for latching data in an amount equivalent to a count of 256 pixels.

In FIG. 18, the value of the count in each of the counters 1701 is a maximum of 256 (eight bits). However, in order to simplify the circuit arrangement, signals of the five higher order bits are used. The data Bk', Y', M', C' of five bits each is held in the latch circuits 1702 and supplied to the color-matching look-up table 1703.

The circuitry from the color-matching LUT 1703 onward is similar to that in FIG. 8 used to describe the first embodiment.

In this embodiment, the degree of similarity to a specific original is investigated based upon the number of printing dots in the period 1VE, without relying upon a matrix operation. In a series scan employing the present invention, 256 dots constitute the width of one scan. Since the recording density is 400 dpi, the width of one scan is about 16 mm (1 VE period). As a consequence, if the short side of a specific original is greater than 16 mm, the major portion of the specific original will be included in the period of 1 VE and will be sensed.

Thus, as described above, effects similar to those of the first embodiment can be fully realized even with the inexpensive hardware configuration of the kind described in the third embodiment.

It should be noted that the present invention may be applied to a system constituted by a plurality of apparatus or to a single apparatus . Further, it goes without saying that the invention is applicable also to a case where a program for implementing the invention is In each of the embodiments described above, an ink supplied jet printer is taken as an example of the printing apparatus. However, this does not impose a limitation upon the invention, for the invention is applicable also to a laser-beam printer and a thermosensitive printer. In particular, the invention is applicable to a so-called bubble-jet printer employing a head of the type which jets droplets by utilizing film boiling that relies upon thermal energy.

In each of the foregoing embodiments, the image of an original is inputted by the scanning section. However, this does not impose a limitation upon the invention, for it is permissible to input an image entered by a still-video camera or ordinary video camera, as well as an image produced by computer graphics.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting binary image data to be processed, the binary image data representing an image;
   generating means for generating multi-value data based upon the binary image data input by said input means;
   memory means for storing multivalue reference data relating to a specific original, which original contains a predetermined pattern;
   judging means for judging whether the image represented by the binary image data is an image of the specific original, based on the multi-value data generated by said generating means and the multi-value reference data stored in said memory means; and
   control means for controlling the apparatus based upon a judgment result provided by said judging means.

2. The apparatus according to claim 1, further comprising output means for outputting the binary image data, the output means being controlled by said control means.

3. The apparatus according to claim 2, wherein said output means is a printer which has a head of a type which jets droplets by utilizing film boiling that relies upon thermal energy.

4. The apparatus according to claim 1, wherein said judging means includes:
   memory means for storing color data of the specific original;
   comparing means for comparing the multi-value data generated by said generating means with the color data stored in said memory means; and
   discriminating means for discriminating, based upon results of comparison performed by said comparing means, a degree of similarity between a color image corresponding to the binary image data and the specific original.

5. The apparatus according to claim 4, wherein said control means includes output halting means for halting output of the binary image data when said judging means judges that the image represented by the binary image data is an image of the specific original.

6. The apparatus according to claim 4 wherein the multi-value data generated by said generating means is color data representing each of a plurality of color component.

7. An image processing apparatus comprising:

input means for inputting multi-value image data to be processed, the multi-value image data representing an image;

conversion means for converting the multivalue image data into binary image data;

output means for outputting the binary image data as reproduction data;

memory means for storing reference data relating to a specific original which original contains a predetermined pattern;

judging means for judging whether the image represented by the multi-value image data is an image of the specific original based on the reference data stored in said memory means; and control means for controlling the output of said output means based upon a judgment result provided by said judging means.

8. The apparatus according to claim 7, further comprising image forming means for forming an image on a medium in accordance with the production data.

9. The apparatus according to claim 8, wherein said image forming means is a printer which has a head of a type which jets droplets by utilizing film boiling that relies upon thermal energy.

10. The apparatus according to claim 7, wherein said judging means includes:

generating means for generating multi-value data based on the binary image data;

comparing means for comparing the multi-value data generated by said generating means with the reference data stored in said memory means; and discriminating means for discriminating, based upon results of comparison performed by said comparing means, a degree of similarity between a color image corresponding to the binary image data and the specific original.

11. The apparatus according to claim 10, wherein said control means includes output halting means for halting output of the binary image data when said judging means judges that the image represented by the multi-value image data is an image of the specific original.

12. The apparatus according to claim 10 wherein the multi-value data generated by said generating means is color data representing each of a plurality of color components.

13. An image processing method comprising the steps of:

inputting binary image data to be processed, the binary data representing an image;

generating multi-value data based upon the binary image data input in said inputting step;

judging whether the image represented by the binary image data is an image of a specific original, which original contains a predetermined pattern, based on (1) the multi-value data generated in said generating step and (2) reference multi-value data relating to the specific original and stored in a memory; and controlling output of the binary image data based upon a judgment result obtained in said judging step.

14. An image processing method comprising the steps of:

inputting multi-value image data to be processed, the multi-value image data representing an image;

converting the multi-value image data into binary image data;

outputting the binary image data as reproduction data;

judging whether the image represented by the multi-value image data is an image of a specific original, which original contains a predetermined pattern, based on reference data relating to the specific original and stored in a memory; and controlling output in said outputting step based upon a judgment result obtained in said judging step.

* * * * *

UNITED STATES PATENT AND TRADEMARK OFFICE
CERTIFICATE OF CORRECTION

PATENT NO. : 5,363,454
DATED : November 8, 1994
INVENTOR(S) : YUTAKA UDAGAWA, ET AL.

It is certified that error appears in the above-identified patent and that said Letters Patent is hereby corrected as shown below:

COLUMN 3

Line 9, "embodiment" should read --embodiments--.

COLUMN 4

Line 3, "paperfeed" should read --paper-feed--.
Line 32, "head 57" should read --head 37--.
Line 68, "attracted" should read --be attracted--.

COLUMN 5

Line 7, "black (K)" should read --black (BK)--.
Line 21, "K," should read --BK,--.

COLUMN 6

Line 14, "mainscanning" should read --main-scanning--.

COLUMN 7

Line 1, "bV" should read --by--.
Line 8, "mast-slave" should read --master-slave--.
Line 57, "processor 10" should read --processor 100--.

COLUMN 8

Line 31, "prior" should read --priority--.
Line 38, "K" should read --BK--.
Line 42, "K" should read --BK--.
Line 46, "K" should read --BK--.
Line 47, "K." should read --BK.--.

UNITED STATES PATENT AND TRADEMARK OFFICE
CERTIFICATE OF CORRECTION

PATENT NO. : 5,363,454
DATED : November 8, 1994
INVENTOR(S) : YUTAKA UDAGAWA, ET AL.

It is certified that error appears in the above-identified patent and that said Letters Patent is hereby corrected as shown below:

COLUMN 8

Line 48, "K)" should read --BK)--.
Line 51, "K" should read --BK--.
Line 53, "K" should read --BK--.
Line 55, "K." should read --BK.--.
Line 64, "K" should read --BK--.
Line 65, "K" should read --BK--.

COLUMN 9

Line 32, "in used" should read --is used--.
Line 40, "Mk" should read --BK--.
Line 44, "Mk" should read --BK--.

COLUMN 10

Line 1, "pixels" should read --pixel--.
Line 8, "register 108," should read --register 801,--.
Line 23, "804-2," should read --804-2, ... ,--.
Line 44, "has" should read --has been--.

COLUMN 11

Line 26, "signal CALK." should read --signal CLK.--.
Line 36, "Numeral. 1303" should read --Numeral 1303--.
Line 45, "signal Yi" should read --signal yi--.
Line 49, "$Yi=(\alpha/255)yi-1\beta \cdot x_{i-1}$ (2)" should read --$yi=(\alpha/255)y_{i-1}+\beta \cdot x_{i-1}$ (2)--.
Line 58, "output Yi" should read --output yi--.

UNITED STATES PATENT AND TRADEMARK OFFICE
CERTIFICATE OF CORRECTION

PATENT NO. : 5,363,454
DATED : November 8, 1994
INVENTOR(S) : YUTAKA UDAGAWA, ET AL.

Page 3 of 4

It is certified that error appears in the above-identified patent and that said Letters Patent is hereby corrected as shown below:

COLUMN 12

Line 1, "output Yi" should read --output yi--.
Line 17, "of" should be deleted.
Line 57, "OR gate." should read --OR gate.--.

COLUMN 13

Line 6, "bit s" should read --bits--.

COLUMN 14

Line 2, "is" should read --is supplied to a system or apparatus.--.
Line 4, "supplied" should be deleted.
Line 31, "multivalue" should read --multi-value--.

COLUMN 15

Line 1, "claim 4" should read --claim 4,--.
Line 4, "component." should read --components.--.
Line 9, "multivalue" should read --multi-value--.
Line 15, "original which" should read --original, which--.
Line 19, "original" should read --original,--.
Line 27, "production" should read --reproduction--.

UNITED STATES PATENT AND TRADEMARK OFFICE
CERTIFICATE OF CORRECTION

PATENT NO. : 5,363,454
DATED : November 8, 1994
INVENTOR(S) : YUTAKA UDAGAWA, ET AL.

It is certified that error appears in the above-identified patent and that said Letters Patent is hereby corrected as shown below:

<u>COLUMN 16</u>

Line 8, "claim 10" should read --claim 10,--.

Signed and Sealed this

Second Day of May, 1995

Attest:

BRUCE LEHMAN

Attesting Officer     Commissioner of Patents and Trademarks